United States Patent
Asanin et al.

(10) Patent No.: US 11,374,238 B2
(45) Date of Patent: Jun. 28, 2022

(54) FLOW FIELD OF A FUEL CELL SEPARATOR WITH IMPROVED WATER BALANCE

(71) Applicant: Bayerische Motoren Werke Aktiengesellschaft, Munich (DE)

(72) Inventors: Savo Asanin, Munich (DE); Fengmin Du, Munich (DE); Julian Arndt Hirschfeld, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 73 days.

(21) Appl. No.: 16/969,267

(22) PCT Filed: Jan. 29, 2019

(86) PCT No.: PCT/EP2019/052074
§ 371 (c)(1),
(2) Date: Aug. 12, 2020

(87) PCT Pub. No.: WO2019/162049
PCT Pub. Date: Aug. 29, 2019

(65) Prior Publication Data
US 2021/0005905 A1    Jan. 7, 2021

(30) Foreign Application Priority Data
Feb. 20, 2018  (DE) .................. 10 2018 202 561.4

(51) Int. Cl.
*H01M 8/0258*  (2016.01)
*H01M 8/0247*  (2016.01)

(52) U.S. Cl.
CPC ....... *H01M 8/0258* (2013.01); *H01M 8/0247* (2013.01)

(58) Field of Classification Search
CPC .................. H01M 8/0258; H01M 8/0247
See application file for complete search history.

(56) References Cited

U.S. PATENT DOCUMENTS

| 2005/0175883 A1 | 8/2005 | Trabold et al. |
| 2007/0259249 A1 | 11/2007 | Lee et al. |

(Continued)

FOREIGN PATENT DOCUMENTS

| DE | 10 2015 211 893 A1 | 12/2016 |
| DE | 10 2011 009 808 B4 | 4/2017 |
| WO | WO 2011/099399 A1 | 8/2011 |

OTHER PUBLICATIONS

International Search Report (PCT/ISA/210) issued in PCT Application No. PCT/EP2019/052074 dated May 2, 2019 with English translation (seven pages).

(Continued)

*Primary Examiner* — Olatunji A Godo
(74) *Attorney, Agent, or Firm* — Crowell & Moring LLP

(57) ABSTRACT

A fuel cell has a gas diffusion layer and a separator plate. The separator plate forms, together with the gas diffusion layer, at least one gas-conducting flow field. At least one channel web of the separator plate has an end with an upper face and an end face. The end face is designed to divide a flow impinging on the end face of the channel web in a first direction into two partial flows. The end face is designed to deflect a liquid of the flow impinging on the end face adjacently to the upper face in such a manner that the liquid is spaced further from the upper face after deflection than before deflection.

10 Claims, 2 Drawing Sheets

(56) References Cited

U.S. PATENT DOCUMENTS

| | | | |
|---|---|---|---|
| 2008/0166614 A1* | 7/2008 | Brinner | H01M 8/0254 |
| | | | 429/439 |
| 2009/0214929 A1 | 8/2009 | Gao | |
| 2011/0195335 A1 | 8/2011 | Goebel et al. | |
| 2012/0028139 A1 | 2/2012 | Kawajiri et al. | |
| 2018/0076469 A1 | 3/2018 | Haase | |

OTHER PUBLICATIONS

German-language Written Opinion (PCT/ISA/237) issued in PCT Application No. PCT/EP2019/052074 dated May 2, 2019 (five pages).

German-language Search Report issued in German Application No. 10 2018 202 561.4 dated Oct. 4, 2018 with partial English translation (11 pages).

\* cited by examiner

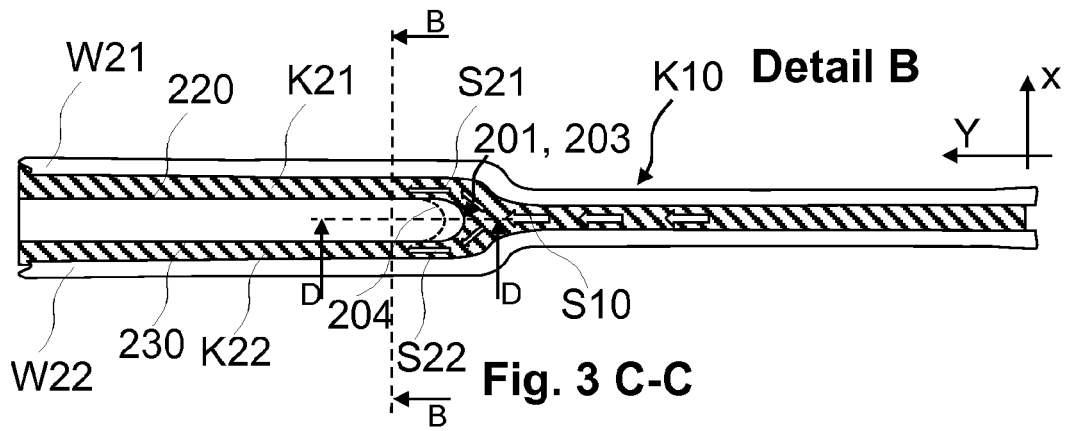
Fig. 3 C-C
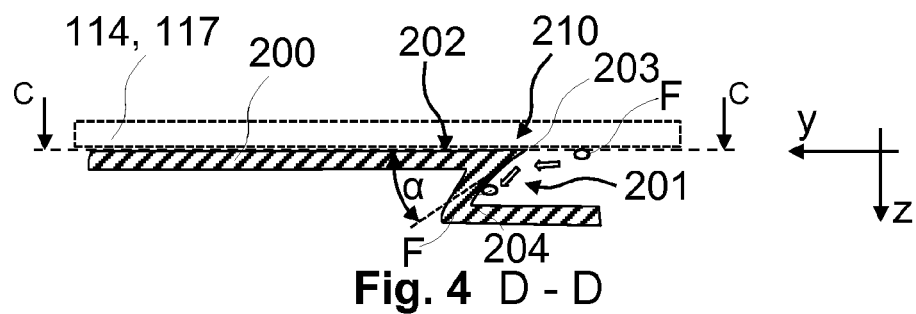
Fig. 4 D - D
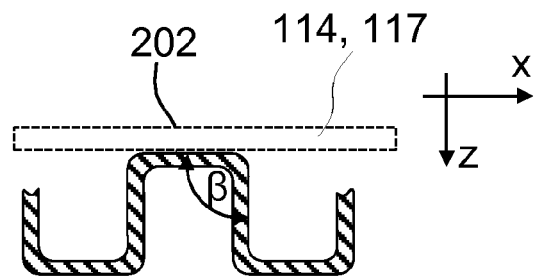
Fig. 5 B - B

FLOW FIELD OF A FUEL CELL SEPARATOR WITH IMPROVED WATER BALANCE

BACKGROUND AND SUMMARY OF THE INVENTION

The technology disclosed herein relates to a flow field of a fuel cell.

The flow field of a fuel cell is formed by the separator plate contour. The fuel, generally hydrogen, and the oxidizing agent, generally air, are located to the sides of the separator plate. In addition, there may be provision of cooling with a coolant $K_{ue}$ in the separator plate. The aim is to uniformly distribute the media (reaction gases, coolant) over the entire active surface. This usually involves forming channel structures for all three media. The flow fields are usually formed from straight channels having a continuously equal width. However, other geometries are also conceivable. There is a need for efficiently conveying product water obtained out of the channel structures.

It is a preferred object of the technology disclosed herein to reduce or eliminate at least one disadvantage of a previously known solution or to propose an alternative solution. It is in particular a preferred object of the technology disclosed herein to efficiently convey product water obtained out of the channel structures. Further preferred objects may result from the advantageous effects of the technology disclosed herein.

The technology disclosed herein relates to a fuel cell system having at least one fuel cell. The fuel cell system is intended for example for mobile applications such as motor vehicles. In its simplest form, a fuel cell is an electrochemical energy converter which converts fuel B and oxidizing agent O into reaction products and produces electricity and heat in the process. With respect to the technology disclosed herein, the term "gas" refers generally to the oxidizing agent O and fuel B of the fuel cell. The fuel cell disclosed herein comprises an anode having an anode space and a cathode having a cathode space, these being separated by an ion-selective separator. The anode has a feed for a fuel to the anode. Preferred fuels are: hydrogen, low molecular weight alcohol, biofuels, or liquefied natural gas. The cathode has for example a feed for oxidizing agent. Preferred oxidizing agents are for example air, oxygen and peroxides. A fuel cell system comprises at least one fuel cell and also peripheral system components (BoP components) which may be used when operating the at least one fuel cell. In general, a plurality of fuel cells are combined into a fuel cell stack.

The fuel cell disclosed herein comprises an ion-selective separator. The ion-selective separator may for example be designed as a proton exchange membrane (PEM). A cation-selective polymer electrolyte membrane is preferably used. Examples of materials for such a membrane include: Nafion®, Flemion® and Aciplex®. In addition, further layers, such as for example a catalyst layer, may be provided at the proton exchange membrane. The fuel cell comprises a gas diffusion layer (hereinafter also referred to as GDL) which is arranged adjacent to the separator. This may for example be a layer of thin, porous carbon paper or carbon fiber woven fabric. The ion-selective separator and the GDL are familiar to those skilled in the art.

The fuel cell further comprises at least one separator plate which together with the gas diffusion layer forms at least one gas-conducting flow field. The separator plate may preferably be a bipolar plate. Preferably, two separator plates, one on either side of the ion-permeable separator, together with the ion-permeable separator form a fuel cell. The bipolar plate may be designed to be liquid-cooled. Other cooling techniques are conceivable, however.

The flow field is expediently arranged in such a way that the gas transported in the flow field can pass over from the flow field directly into the gas diffusion layer. The gas diffusion layer thus separates the flow field from the ion-selective separator. In this context, a predistributor channel structure which is not arranged at the active surfaces of the ion-permeable separator, at which active surfaces the electrochemical reactions take place, should not be considered to be the flow field. In particular, the flow field, together with the ion-selective separator and with the gas diffusion layer, forms the cathode space and anode space. The flow field preferably has a plurality of channels and/or a plurality of channel sections, with the separator plate, the gas diffusion layer and the ion-selective separator, by way of the formation of the plurality of channels, together forming a flow field for the fuel B (anode space) or for the oxidizing agent O (cathode space). An essentially rectangular base area, which forms the flow field, is preferably provided in the separator. However, other base area geometries are also conceivable. The plurality of channels and/or channel sections preferably have the same general flow direction S. The plurality of channels and/or channel sections for gas preferably extend from an inlet region of the flow field to an outlet region of the flow field. Preferably, the inlet region is arranged on one side of the base area and the outlet region is arranged on an opposite side of the base area. The channels and/or channel sections are particularly preferably designed in the manner disclosed in the German patent application, originating from the applicant, with the publication number DE 10 2015 211893 A1, the content of which in relation to the configuration of the channel sections is expressly incorporated herein by way of reference.

At least one channel section can be formed by at least one channel web. In particular, therefore, at least one channel web is part of the separator plate. The channel web expediently has an end. At least this end comprises a top side and a face side or front surface (hereinafter only the term "face side" will be used, which is intended to encompass both terms). The top side is oriented towards the gas diffusion layer. The top side extends essentially parallel to the plane which is formed by the gas diffusion layer. A plurality of channel webs, in particular the top sides thereof, expediently define a separator plate plane which is formed essentially parallel to the gas diffusion layer. The channel web is expediently configured to split a flow, which impinges on the face side of the channel web in a first direction, into two partial flows. The flow preferably impinges on the face side of the channel web frontally.

The technology disclosed herein is based on the idea that the face side is configured to deflect liquid of the flow, which impinges on the face side adjacently to the top side, in such a way that the liquid after the deflection is spaced further apart from the top side than prior to the deflection.

In this respect, the face side and the top side expediently form an acute internal angle α. The acute internal angle is preferably an angle between 0° and less than 90° or between 30° and less than 90° or between 45° and less than 90° or between 60° and less than 90°. If the top side and/or the bottom side are designed to be curved, the internal angle is formed by tangents adjacent to the edge formed by the top side and face side, any phases or curvatures of the edge itself not being taken into account.

In other words, the top side and the face side can form a proximal top edge, wherein the proximal top edge is spaced less far apart from the gas diffusion layer than a distal bottom edge of the face side. The top edge is arranged protruding counter to the first direction relative to the bottom edge.

Expressed in other words in turn, the face side is designed as an undercut or as an edge which can be engaged behind in a plan view onto the separator plate.

Preferably, the top edge and/or the bottom edge are designed in an arcuate manner in a plan view onto the separator plate, that is to say in a direction perpendicular to the separator plate plane.

The face side can be a convexly curved face side which transitions into the sidewalls of the channel web, in particular in such a way that a crest line around which the first flow passes is designed in a protruding manner compared to the transitions to the sidewalls.

In one embodiment, the face side may have a three-dimensional curvature. The face side can be concavely curved in a direction perpendicular to the separator plate plane. The face side can be convexly curved in a side view, in particular in a cross-sectional view along a plane extending through the channel web longitudinal axis and perpendicularly with respect to the separator plate plane.

The channel web has side walls. The at least one sidewall or both sidewalls in each case form a side wall internal angle $\beta$ with the top side of between 90° and 120° or between 90° and 100°. In other words, the channel web widens as the distance from the gas diffusion layer increases.

In other words, the technology disclosed herein relates to configuring the channel walls and in particular the channel web disclosed herein in such a way that the product water is conveyed out of the regions (in particular the corners) adjacent to the gas diffusion layer in order thus to ensure redistribution of the water within the channels. The water redistribution results in an improved removal of water as a film flow in the regions distal to the gas diffusion layer, in particular in the corners of the bipolar plate flow field channels.

Such a removal of water can for example be realized by a (in particular conical) installed component for diverting the liquid water, which may be provided at a channel sidewall of the separator plate and is configured to deflect water flowing along the sidewall proximal to the gas diffusion layer toward distal regions in the channel section, in particular toward an upper edge. The installed component and/or the distal region can preferably be designed to be more hydrophilic than the regions of the channel sidewall and/or of the gas diffusion layer. As an alternative or in addition, it may be provided that at least the channel sidewall is designed to be more hydrophilic than the gas diffusion layer. The droplet will then preferentially migrate along the path over the installed component rather than move along the lower edge.

As an alternative or in addition, at least one channel sidewall of the separator plate can have hydrophilic strips which for example may have been applied in a coating process (CVD, PVD) and/or which are designed to be more hydrophilic than the gas diffusion layer. The strips expediently begin proximally to the gas diffusion layer and extend from there along the channel sidewall and away from the gas diffusion layer, wherein they may preferably be arranged to extend obliquely in the gas flow direction. Such strips may also promote the removal of liquid.

Alternatively, the channel sidewall may, at least in regions and preferably, within the flow field, completely, be designed in such a way that the hydrophobicity decreases as the distance from the gas diffusion layer increases.

The measures disclosed here have the effect that liquid water is transported out of the regions adjacent to the gas diffusion layer and into regions spaced further away, out of which the liquid water can be better transported. The service life of the fuel cell is improved since local accumulations of water, which could cause damage to the cell, can be avoided or reduced.

The technology disclosed herein will now be elucidated on the basis of the figures.

BRIEF DESCRIPTION OF THE DRAWINGS

FIG. 3 is a schematic plan view onto a part of a separator 119 along the line C-C in FIG. 4.

FIG. 4 is a schematic view along the line D-D in FIG. 3.

FIG. 5 is a schematic view along the line B-B in FIG. 3.

DETAILED DESCRIPTION OF THE DRAWINGS

Figure 1:
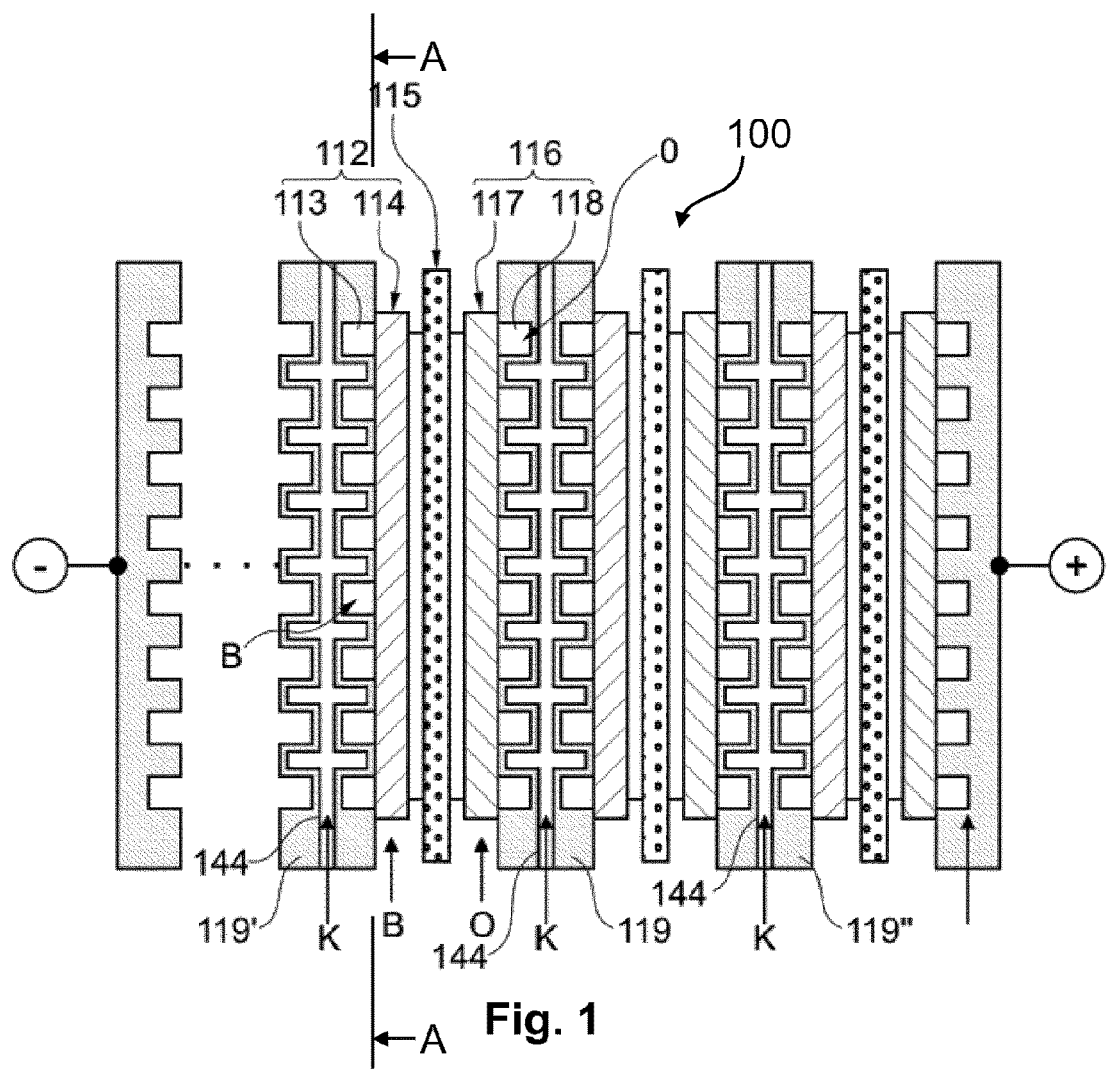
FIG. 1 is a schematic drawing of a fuel cell stack having a plurality of fuel cells 100.

FIG. 1 shows an enlarged illustration of a fuel cell stack having a plurality of adjacent fuel cells 100. Two adjacent separator plates 119, 119', 119" delimit a fuel cell 100 in each case. Coolant flow paths 144, through which coolant K flows, are arranged in each of the separator plates 119, 119', 119". It is likewise conceivable to provide separator plates through which coolant does not flow. The gas-conducting channel 113 of the separator plate 119' and the adjacent space inter alia with the gas diffusion layer 114 here form the anode space 112 which is delimited by the separator plate 119' and the polymer electrolyte membrane 115. The fuel cell 100 or the fuel cell stack guides fuel B, for example hydrogen, into this anode space 112. Together with the gas diffusion layer 117, the gas-conducting channel 118 forms the cathode space 116 through which the oxidizing agent stream O flows. The fuel cell stack shown here is delimited laterally by end plates which are not discussed further here.

Figure 2:
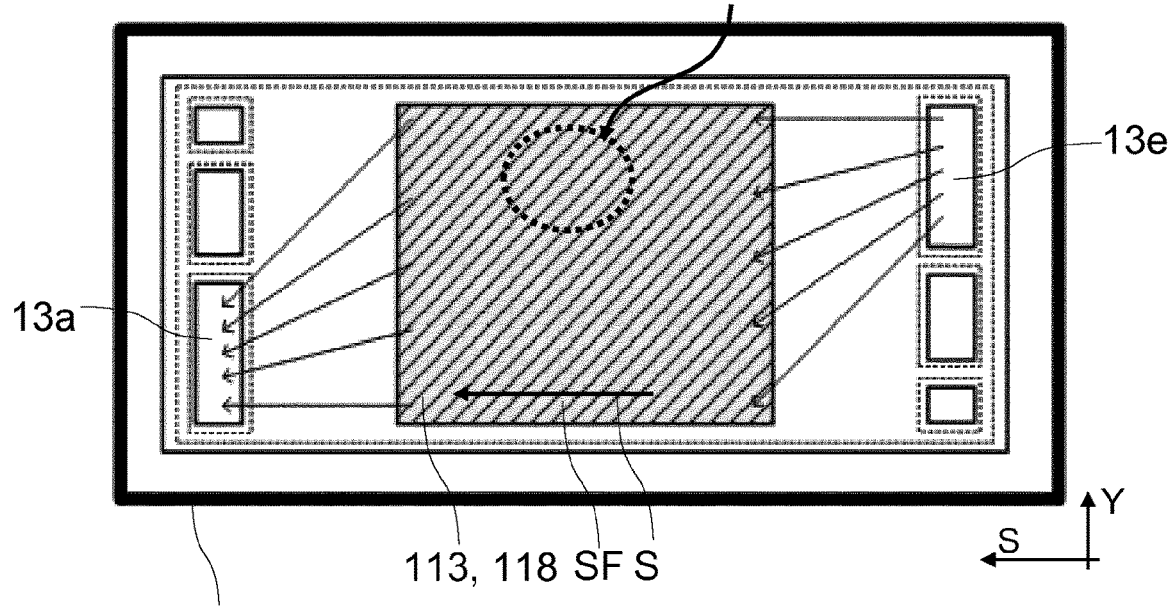
FIG. 2 is a schematic plan view onto a separator 119 along the line A-A in FIG. 1.

FIG. 2 shows a schematic plan view along the line A-A in FIG. 1. Here, the three media channels for oxidizing agent O, fuel B and coolant $K_{ue}$ are arranged in each case on two opposite sides. Other configurations are conceivable, however. The flow field is supplied with gas via the media port 13e. The gas may for example be air, which functions as the oxidizing agent O. It is also conceivable for the gas to be fuel gas B. Hereinafter, gas is referred to in general. On the right-hand side, a distributor structure V (cf. FIG. 3) which distributes the gas over the flow field SF, is illustrated with arrows. On the left-hand side, in turn, the structure which collects the gas before the gas leaves the fuel cell via the media outlet 13a on the left-hand side, is illustrated with arrows. The precise course of the channels 113, 118 is not illustrated in more detail in FIG. 2. Shown here is a separator plate 119 which has both anode channels 113 and cathode channels 118. Of course, it would also be possible for just one of these channels to be provided.

FIG. 3 shows in highly simplified form a portion of detail B of an embodiment of the separator plate 119. The figure is a plan view onto the separator plate plane X, Y. Shown here by way of example is a first flow S10 in a first channel section K10, which flow splits into two partial flows S21, S22. The two partial flows S21, S22 flow through two channel sections K21, K22. The geometry and the arrangement of the channel sections K10, K21, K22 may also be configured in a different manner. In general, a multiplicity of such first and second channel sections K10, K21, K22 are provided in a flow field of a separator plate 119. Likewise, the arrangement and/or the configuration of the channel walls W21, W22 may also be configured in a different manner.

The first flow S10 is split here by the face side 201, around which flow passes, which is provided at the end 210, around which flow passes, of the channel web 200. Here, the face side 201, with the top side 202, forms the top edge 203. Compared to the bottom edge 204, this top edge 203 is designed to protrude counter to the flow S10. The face side 201 extends here from the top edge 203 to the bottom edge 204. The face side 201 and the top edge 203/bottom edge 204 are designed here in a curved manner/in plan view in an arcuate manner.

The top edge 203 is designed to be directly adjacent to the gas diffusion layer 114, 117. In general, the gas diffusion layer 114, 117 bears against the top side 202 or the top edge 203. The bottom edge 204 is spaced further apart from the gas diffusion layer 114, 117 than the top edge 203.

FIG. 4 shows a schematic view along the line D-D in FIG. 3. The liquid F, here product water, is diverted by the form and arrangement of the face side 201 from proximal regions of the first channel section K10 into distal regions of the first or second channel section K10, K21, K22, which are spaced further apart from the gas diffusion layer 114, 117 than the proximal regions. In other words, the face side 201 is configured to deflect a liquid F of the flow S10, which impinges on the face side 201 adjacently to the top side 202, in such a way that the liquid F after the deflection is spaced further apart from the top side 202 than prior to the deflection. This can expediently be implemented by the face side 201 and the top side 202 forming an acute internal angle α. Expressed in other words yet again, the face side 201 or the end 210 is designed as an undercut. As can readily be seen here, the face side 201 is designed to be concavely curved in this sectional plane.

FIG. 5 shows a schematic view along the line B-B in FIG. 3. The sidewalls here form a sidewall internal angle β of approx. 90°. This sidewall internal angle β is preferably slightly greater than 90°.

The term "essentially" (e.g. "essentially perpendicular axis") in the context of the technology disclosed herein encompasses in each case both the precise property or the precise value (e.g. "perpendicular axis") and deviations which are negligible for the function of the particular property/value (e.g. "tolerable deviation from perpendicular axis").

The preceding description of the present invention serves illustrative purposes only and does not serve to restrict the invention. Within the context of the invention, various changes and modifications are possible without departing from the scope of the invention and its equivalents.

What is claimed is:

1. A fuel cell, comprising:
an ion-selective separator;
a gas diffusion layer which is arranged adjacent to the separator; and
a separator plate which together with the gas diffusion layer forms a gas-conducting flow field;
wherein at least one channel web of the separator plate has an end with a top side and a face side;
wherein the face side is configured to split a flow, which impinges on the face side of the channel web in a first direction, into two partial flows; and
wherein the face side is configured to deflect a liquid of the flow, which impinges on the face side adjacently to the top side, such that the liquid after the deflection is spaced further apart from the top side than prior to the deflection.

2. The fuel cell according to claim 1, wherein the face side and the top side form an acute internal angle.

3. The fuel cell according to claim 1, wherein the face side is configured as an undercut in a plan view onto the separator plate.

4. The fuel cell according to claim 1, wherein
the top side and the face side form a proximal top edge,
the proximal top edge is spaced less far apart from the gas diffusion layer than a distal bottom edge of the face side, and
the top edge is arranged protruding counter to the first direction relative to the bottom edge.

5. The fuel cell according to claim 4, wherein the top edge and/or the bottom edge are configured in an arcuate manner in a plan view onto the separator plate.

6. The fuel cell according to claim 1, wherein the face side is a convexly curved face side which transitions into sidewalls of the channel web.

7. The fuel cell according to claim 1, wherein the face side has a three-dimensional curvature.

8. The fuel cell according to claim 6, wherein the face side is concavely curved in a direction perpendicular to a plane of the separator plate.

9. The fuel cell according to claim 6, wherein the face side is convexly curved in a side view.

10. The fuel cell according to claim 1, wherein
the channel web has sidewalls, and
the sidewalls in each case form a side wall internal angle with the top side of between 90° and 120° or between 90° and 100°.

* * * * *